Patented Apr. 25, 1939

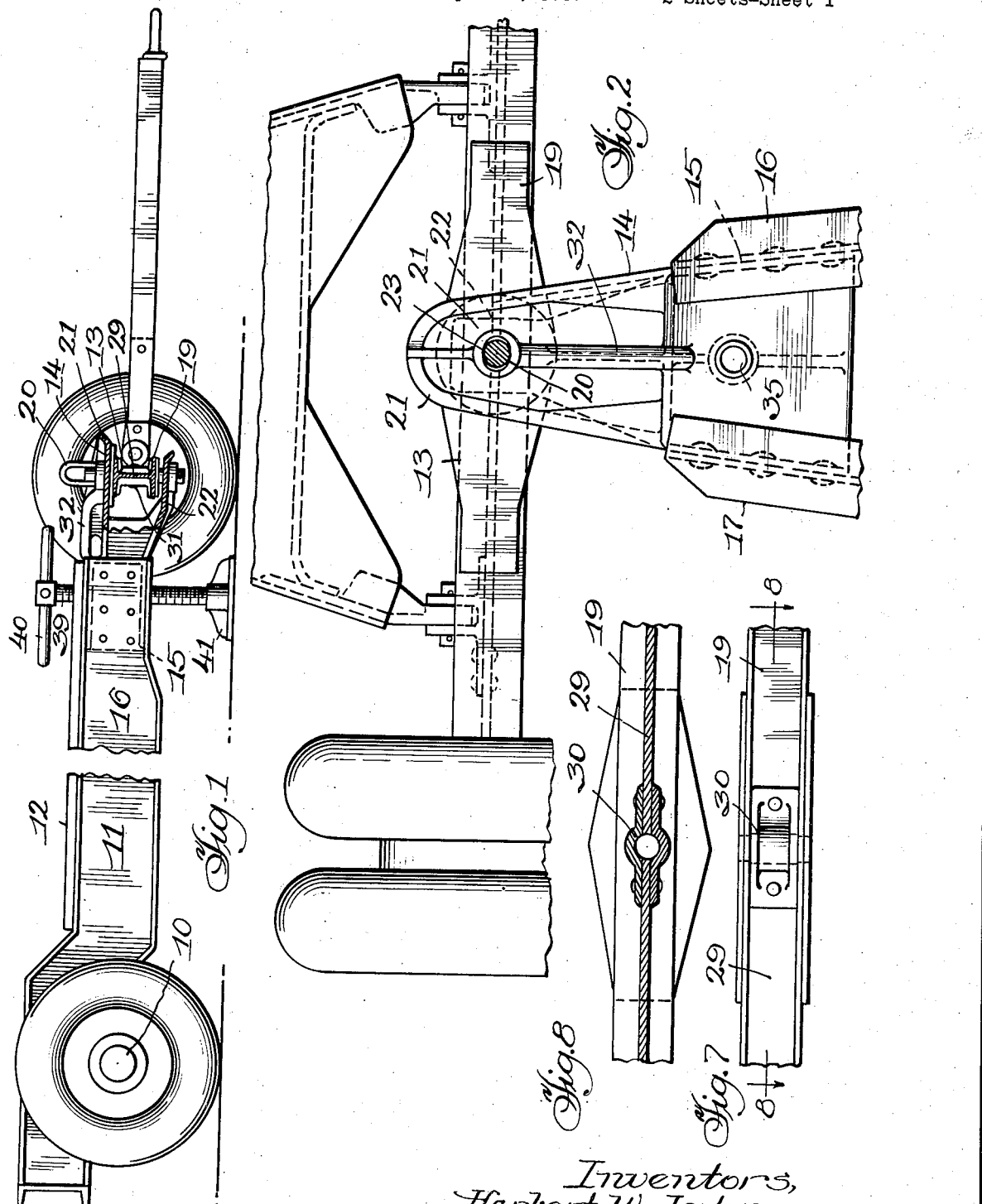

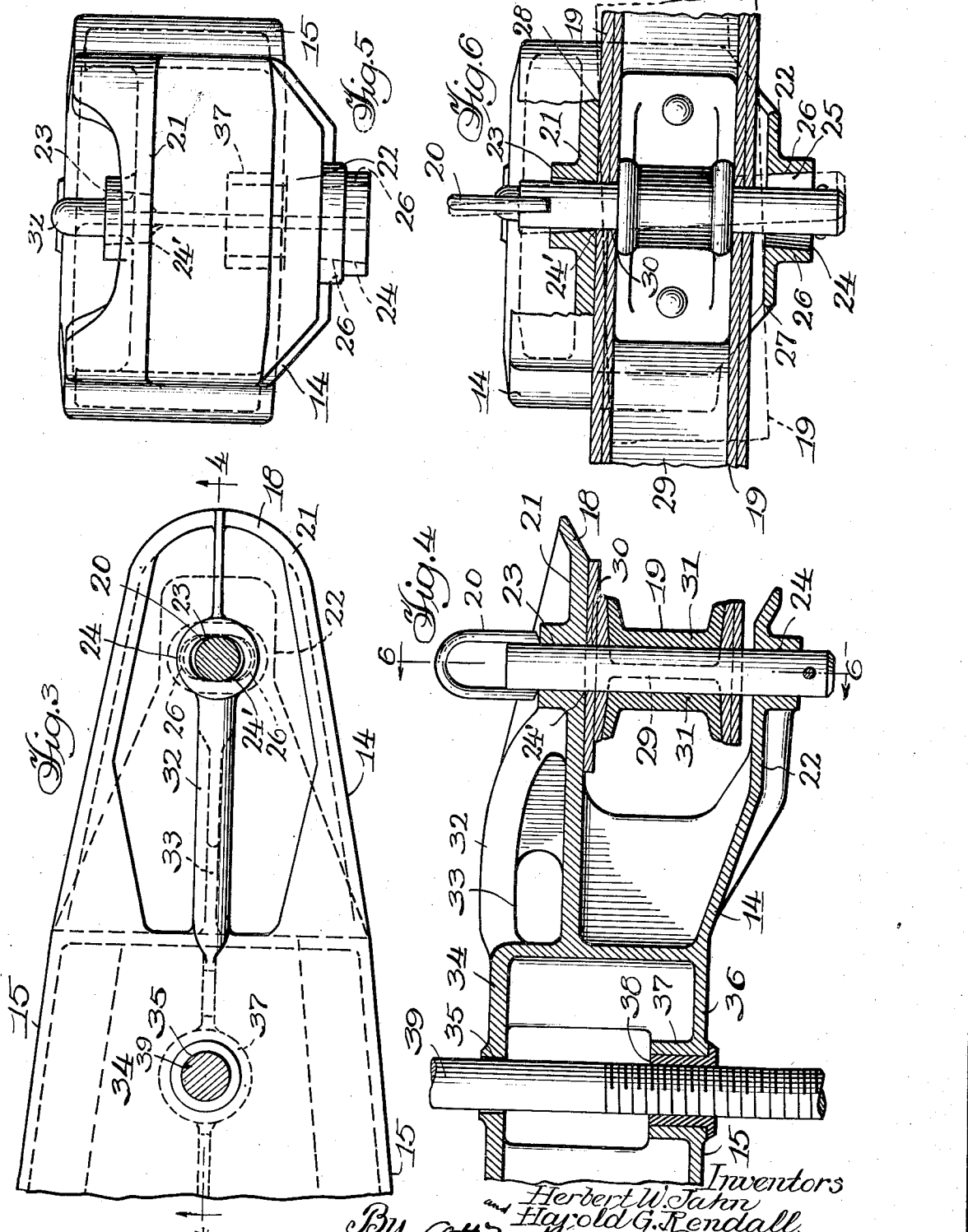

2,155,940

UNITED STATES PATENT OFFICE 2,155,940

VEHICLE AXLE COUPLING

Herbert W. Jahn and Harold G. Rendall, Chicago, Ill., assignors to C. R. Jahn Company, Chicago, Ill., a corporation of Illinois Application September 15, 1937, Serial No. 163,878

2 Claims. (Cl. 280—132)

The invention relates to improvements in vehicles and primarily to the connection between the body frame and an axle of the vehicle, such as for instance the front axle through which the vehicle is directed in its course.

The invention has among its various objects the provision of means whereby said axle may rotate in a horizontal plane and in addition may swing in planes transverse to the horizontal to thereby compensate for inequalities of the road surface without tilting the body of the vehicle, the structure providing means preventing displacement or rotation of said axle about its longitudinal axis.

The invention also has as one of its objects the provision of a member providing an element of a connection between said member and axle, said member being capable of attachment to the sills of the vehicle frame, said member being constructed so that it may readily be attached and detached or separated from the axle to thus allow one end of the vehicle, particularly the front end to which said member is attached, to be dropped or lowered to facilitate loading and unloading of the vehicle.

It is a further object of the invention to provide a member having the above mentioned characteristics, with means whereby said end of the vehicle may be elevated to a position in which the axle may be associated with said body after loading of the vehicle.

In addition it is an object of the invention to form said member of a casting, one end of which is bifurcated to receive the axle this end being provided with an opening for the reception of a removable king pin providing a coupling to separably couple said member and axle together, said member also having means for maintaining the king pin in a position preventing rotation of said axle on its longitudinal axis yet will permit rotation of said axle in a horizontal plane and in addition allow the axle to be moved with relation to said member and thereby permit movement of the axle in planes transverse to the horizontal.

The invention has these and other objects all of which will be explained in detail and more readily understood when read in conjunction with the accompanying drawings which illustrate one embodiment of which the invention is susceptible, it being obvious that changes and modifications may be resorted to without departing from the spirit of the appended claims forming a part hereof.

In the drawings,

Fig. 1 is a side elevation of a vehicle having the invention applied thereto, certain parts thereof being shown in section for the purpose of illustration.

Fig. 2 is a plan view of a portion of the front end of the vehicle illustrated in Fig. 1.

Fig. 3 is a plan view of an element of the structure shown in Figs. 1 and 2.

Fig. 4 is a sectional view taken on line 4—4 of Fig. 3.

Fig. 5 is a front end view of the device shown in Fig. 3.

Fig. 6 is a sectional view taken in line 6—6 of Fig. 4.

Fig. 7 is a side view of a portion of the axle employed in the device.

Fig. 8 is a sectional view taken on line 8—8 of Fig. 7.

The vehicle shown in the drawings is designed for conveying heavy machinery such as a tractor, excavator, steam shovel or the like.

To facilitate loading and unloading of the vehicle the front axle is detachable from the vehicle body which thereby allows the adjacent end of the vehicle body to be dropped and arranged to allow the machine to be transported by the vehicle to travel over the lowered end of the vehicle, after which the lowered end is elevated to bring it to a position in which the axle may be coupled with the platform.

The vehicle shown includes the rear axle 10, the beam or main frame 11, a platform 12 and the removable axle generally designated 13.

The means whereby the several above mentioned objects and advantages may be accomplished includes a casting generally designated 14. One end such as 15 of this casting is designed for attachment thereto of the side frame members of beams respectively designated 16 and 17. The opposite end 18 of said casting is of a bifurcated character and is fashioned in this manner to receive the front axle of the vehicle the axle being generally designated 19, which as before stated is designed to be separably and removably attached to the bifurcated end of the member generally designated 14. The axle and the member generally designated 14 are separably coupled with each other through the agency of a king pin 20 which forms the axis of rotation in a horizontal plane of the axle, transmits draw bar pull to frame members, assists in maintaining the axle against rotation on its longitudinal axis and in addition provides an element of means whereby the axle may tilt in a vertical direction relative to the remaining structure to thus compensate for inequalities in the road surface.

The member generally designated 14 is as before stated bifurcated at its front end, the bifurcation being formed by the members respectively designated 21 and 22, between which the axle generally designated 19 is inserted. Each of the elements 21 and 22 are respectively provided with the vertically aligned openings respectively designated 23 and 24. These openings 23 and 24 are provided to receive the king pin 20 and are fashioned to maintain the king pin against displacement in either a forward or rearward direction, yet will allow displacement of the king pin in lateral directions transverse to said first mentioned direction which thereby allows movement of the axle relative to the body in vertical directions or in other words transverse to its usual rotative movement in a horizontal plane.

From the inspection of Fig. 4 it is readily apparent that the diameter of the openings 23 and 24 in one direction substantially correspond with the diameter of the king pin 20. By referring to Fig. 6 it will be seen that the opening 23, of the bifurcation element 21, is of a tapered character, the lower part of this tapered opening being of a diameter substantially corresponding to the diameter of the king pin 20, the larger dimension being uppermost, thus the king pin will engage the annular shoulder 24' (see Fig. 6). This annular shoulder forms a pivot upon which the king pin may swing to thus afford movement of the axle in a vertical direction. Since the smaller portion of the tapered opening 23 substantially corresponds with the diameter of the king pin it is manifest that the upper end of the coupling pin is held against displacement in directions either forward or rearward and in directions transverse thereto. The opening 25 formed in the lower member 22, is of a width substantially corresponding to the diameter of the king pin, however is of length substantially greater than this diameter, and thus provides means whereby the lower end of the coupling pin may move in lateral directions as shown in Fig. 6. The end walls 26—26 of the opening 25 are tapered to thus afford movement of the pin and provide a bearing surface for the pin 20 when the latter is moved on the pivot 24'.

Since the front and rear walls of the opening 25 are spaced from each other a distance substantially equal to the diameter of the king pin and since the lowermost portion of the upper opening 23 also corresponds in diameter with the diameter of the king pin, it is believed manifest that the king pin is held against movement in either a forward or rearward direction which thus prevents rotative movement of the axle upon its longitudinal axis. It is also believed evident that since the lower opening 25 is of an elongated character in one direction, this will provide for movement of the king pin and axle and permit rotative movement of the axle in vertical directions without interfering with rotative movement of the axle in a horizontal plane.

By referring to Figs. 3 and 6, it will be seen that the uppermost member 21, of the bifurcation is of a width substantially greater than the lower member 22 and since the axle is of a dimension somewhat less than the distance between the elements 21 and 22, the axle may tilt in vertical directions until the upper and lower surfaces of the axle engages one of the edges such as 27—28 of the members 21 and 22 without interference with rotatability of the axle in a horizontal plane and planes substantially corresponding thereto. Here the opposed edges 27—28 of the members 21—22 serve as strike plates limiting the tilting of the axle vertically as compared with the relatively horizontal rotatability of the axle as clearly shown in dotted lines, Fig. 6 of the drawings. The axle 19 is in the present instance formed of an I beam, the web 29 and the flanges at the upper and lower portion of the web, being formed with the opening 30 for the reception of the king pin 20, means 31 is arranged at opposite sides of the opening 30, which is bolted or otherwise connected to the web of the I beam to thus form a sleeve of substantial strength which surrounds the king pin.

The casting or member 14 is webbed at various portions thereof to add strength thereto, and in addition is provided with means 32, having the aperture 33 provided therein for the purpose of accepting a hook or chain, for assisting in raising or lowering this end of the vehicle during loading and unloading operations, to thus position this end of the vehicle so that the axle and its associated elements may be readily associated and removed from the body of the vehicle when this is found necessary or desirable.

The casting or member 14 may be provided with means for receiving a mechanism for raising and lowering the front end of the vehicle in the manner herein before referred to and holding this end in an elevated position, to thus compensate for a situation in which a mechanical or power driven hoist is not available to raise and lower this end of the vehicle. To accomplish this the wall 34 of the member 14 is provided with an opening 35 and the wall 36 of the member 14 is provided with an annular boss 37, which is provided for the reception of a nut 38. This nut 38 is provided for cooperation with the jack screw 39, having the handle 40 and the base or foot piece 41. The upper portion of this jack screw 39 is guided in an opening 35 and manifestly as this jack screw is operated it causes the front end of the vehicle frame to be raised and lowered in the manner and for the purpose herein before referred to.

From the foregoing description of the invention it is believed evident that a structure is provided capable of being attached to the beams of the vehicle frame which affords a connection with the axle of the vehicle the structure being formed to provide means whereby the front axle is held for rotation in generally horizontal planes, will prevent rotation of the axle on its longitudinal axis yet will permit the axle to cant or tilt in a vertical direction to compensate for inequalities of the road surface.

It is further believed manifest that the invention provides means whereby the end of the vehicle adjacent the front axle may be raised and lowered to facilitate loading and unloading of the vehicle and in addition arrange said end of the vehicle so that the axle may be readily associated with and be removed from the vehicle when this is found necessary or desirable.

Having thus described the invention what we claim and desire to cover by Letters Patent is:

1. In a vehicle having a frame and an axle, a coupling for affixing the axle to the frame whereby said axle may rotate in a plane substantially parallel to the plane of travel of the vehicle, said coupling adapted to be affixed to the frame and having a bifurcated portion extending both above and below the axle, a king pin adapted to pass through each bifurcation of the coupling and the axle, a tapered bearing for the pin in each bifurcation of the coupling to accommodate the pivotal movement of the axle with respect thereto in a plane substantially normal to the plane of rotation, and a strike plate on each bifurcation of the coupling providing bearing against which the axle may impinge and thus be limited in its pivotal or relatively vertical movement.

2. In a vehicle having a frame and an axle, a coupling for affixing the axle to the frame whereby said axle may rotate in a plane substantially parallel to the plane of travel of the vehicle, said coupling adapted to be affixed to the frame and having a bifurcated portion extending both above and below the axle, a king pin adapted to pass through each bifurcation of the coupling and the axle, a tapered bearing for the pin in each bifurcation of the coupling to accommodate the pivotal movement of the axle with respect thereto in a plane substantially normal to the plane of rotation, a strike plate on each bifurcation of the coupling providing bearing against which the axle may impinge and thus be limited in its pivotal or relatively vertical movement, and a jack for raising and lowering one end of said vehicle frame, said coupling providing one member of the jack.

HERBERT W. JAHN.
HAROLD G. RENDALL.